Figure 1:
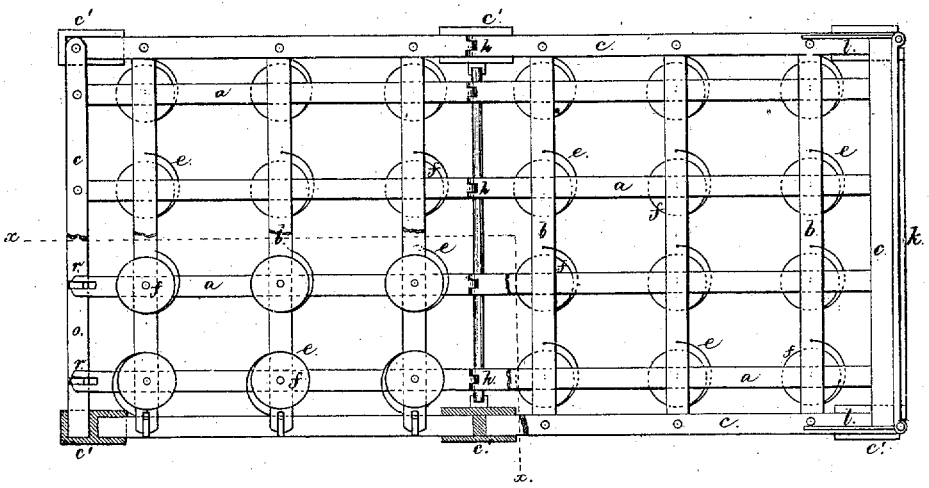

I. PECHNER.

Spring-Bed Bottoms.

No. 5,189. Reissued Dec. 17, 1872.

Witnesses,

Chas. H. Smith

Geo. T. Pinckney

Isador Pechner assignee

Lemuel W. Serrell atty.

AM. PHOTO-LITHOGRAPHIC CO. N.Y. (OSBORNE'S PROCESS.)

UNITED STATES PATENT OFFICE.

E. KRIEGHOFF, OF TORONTO, CANADA, ASSIGNOR TO ISADOR PECHNER, OF NEW YORK CITY.

IMPROVEMENT IN SPRING BED-BOTTOMS.

Specification forming part of Letters Patent No. 66,598, dated July 9, 1867; reissue No. 4,940, dated June 11, 1872; reissue No. 5,189, dated December 17, 1872.

*To all whom it may concern:*

Be it known that E. KRIEGHOFF, formerly of Rochester, now of Toronto, in the Province of Ontario, Dominion of Canada, did invent an Improvement in Spring Bed-Bottoms, and the following is declared to be a correct description thereof.

This invention relates to a spring bed-bottom made of metal bands or slats, interlaced and fastened together to form two flexible frames, between which spiral or hour-glass springs are introduced at the points of intersection, and secured by the ends of the springs being bent where they are connected with the metal bands or slats, and pieces of flexible material, such as leather or felt, are introduced where the springs come into contact with the bands or slats to prevent noise when in use.

Spring bottoms have been made to form part of a metallic bedstead. In this bed-bottom both sides are alike, or nearly so, and may be used either side upward, and the bed-bottom is not necessarily a part of the bedstead. As an additional convenience the bed-bottom may be hinged in the center so as to be folded for transportation.

In the drawing, the improved spring bed-bottom is represented as applied to an iron bedstead of peculiar construction.

Figure 2:
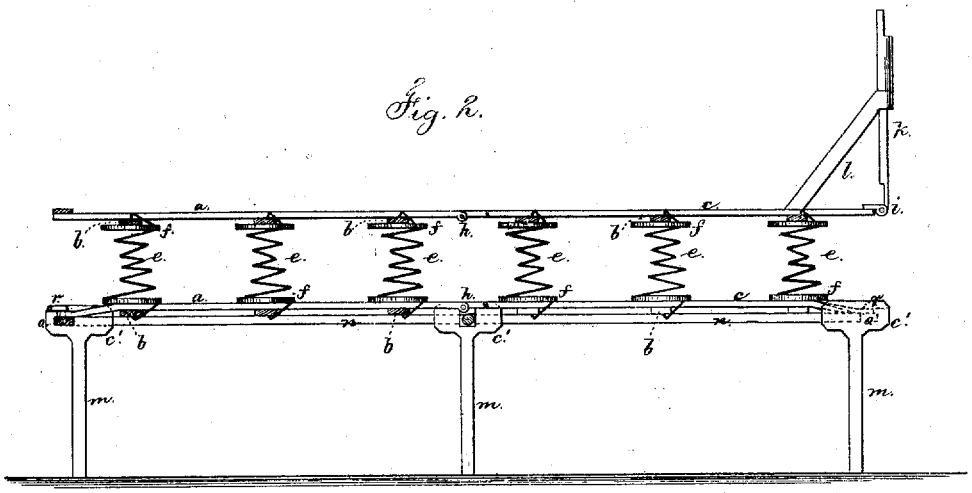

Figure 1 is a plan of the bed-bottom and bedstead, one portion of the latter being in section; and Fig. 2 is a side view of the bed-bottom and bedstead, partially in section, at the line *x x*.

The metal slats or bands *a a* and *b b* cross each other, and may be interlaced, the ends of said slats or bands being secured by rivets to the surrounding frame-bands *c c*. Two of these frames and slats are provided, of the same size and shape, or nearly so, and between them the springs *e e* are introduced at the intersections of the slats *a* and *b*, and the wires of the springs are interlaced with the slats near the ends of the springs, and the ends of the wires are bent into a hook for securing the springs in their places. There are pieces of leather, felt, or similar material, introduced to prevent noise from the contact of the springs with the slats or bands of metal. These are shown in the form of disks *f f*.

For convenience in transportation the frames of the metal slats are represented as hinged or jointed at *h h* to allow of folding the bed-bottom near the middle. The head-board or guard *k* is shown as attached to the end portion of the upper frame of slats by a hinge at *i*, and braces *l* sustain the same. These parts may be disconnected for transportation. The bedstead is shown as composed of the legs *m* with blocks *c'* upon the upper ends, and mortises for receiving the ends of the side rails *n* and end rails *o*. These may be removed for packing. The intermediate posts *m* may also be similarly made. The slats *a* may be connected to the end rails *o* of the bedstead by the hooks or pins *r* that turn in holes in the rails *o*, and slots in the slats *a* receive such hooks. By turning the hooks around the slats will be firmly held in place.

What is claimed as the invention of said KRIEGHOFF is—

1. The top and bottom frames made of the metal slats or bands *a* and *b* crossing each other, and attached at the ends to the surrounding frame *c*, in combination with the springs *e e* applied at the points of intersection of the slats *a* and *b*, and secured to the same, substantially as set forth.

2. The longitudinal slats of the top and bottom metal frames, united by hinges at or near the middle so as to allow for folding, substantially as set forth.

3. The head-rest, hinged to the frame *c* and provided with braces, as and for the purposes set forth.

4. The end rails *o* of the bedstead and the turning-hooks *r*, in combination with the metal slats *a* having slots for said hooks, substantially as set forth.

Signed by me this 11th day of October, A. D. 1872.

I. PECHNER.

Witnesses:
GEO. T. PINCKNEY,
HAROLD SERRELL.